Sept. 13, 1960      L. A. LEIFER      2,952,168
AUTOMATIC RAM-TYPE TURRET LATHE
Original Filed Dec. 20, 1951      8 Sheets-Sheet 1
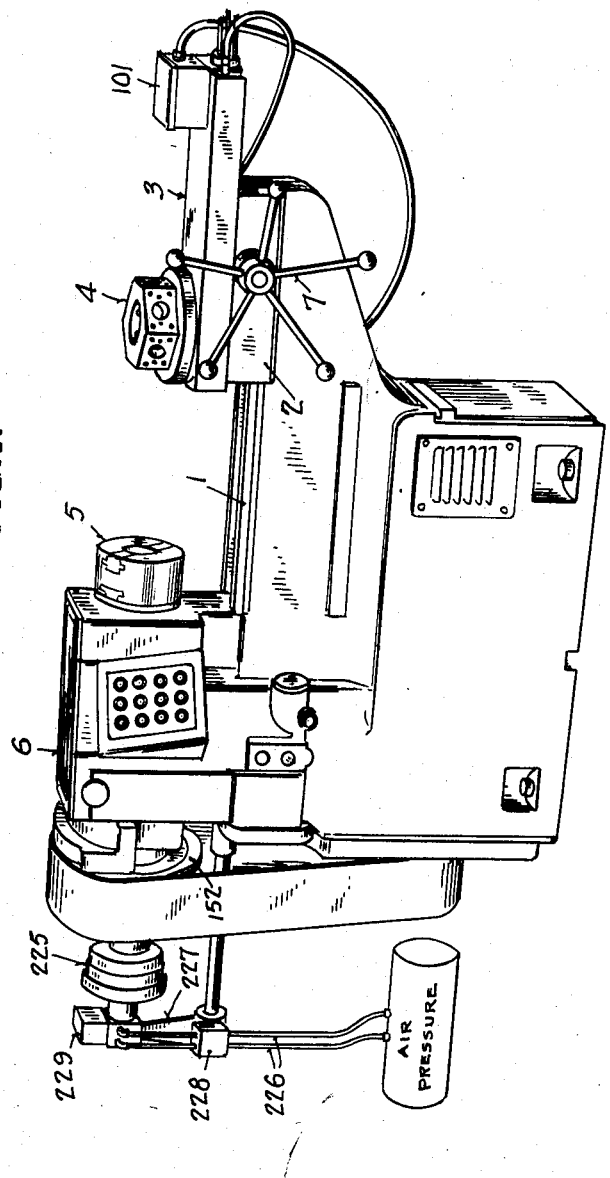
INVENTOR
Lorenz A. Leifer
BY
Andrus, Sceales & Starke
ATTORNEYS.

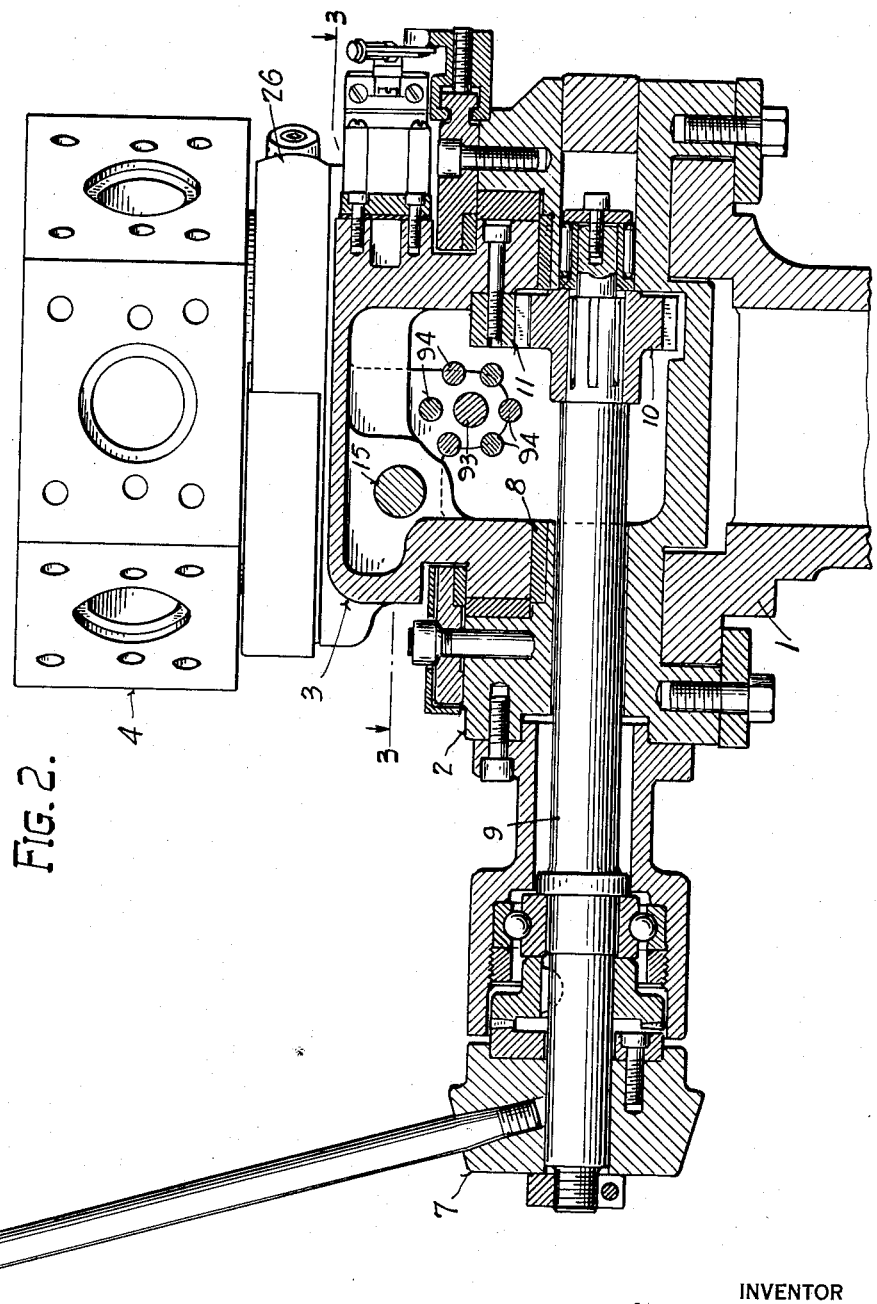

Sept. 13, 1960     L. A. LEIFER     2,952,168
AUTOMATIC RAM-TYPE TURRET LATHE
Original Filed Dec. 20, 1951     8 Sheets-Sheet 3
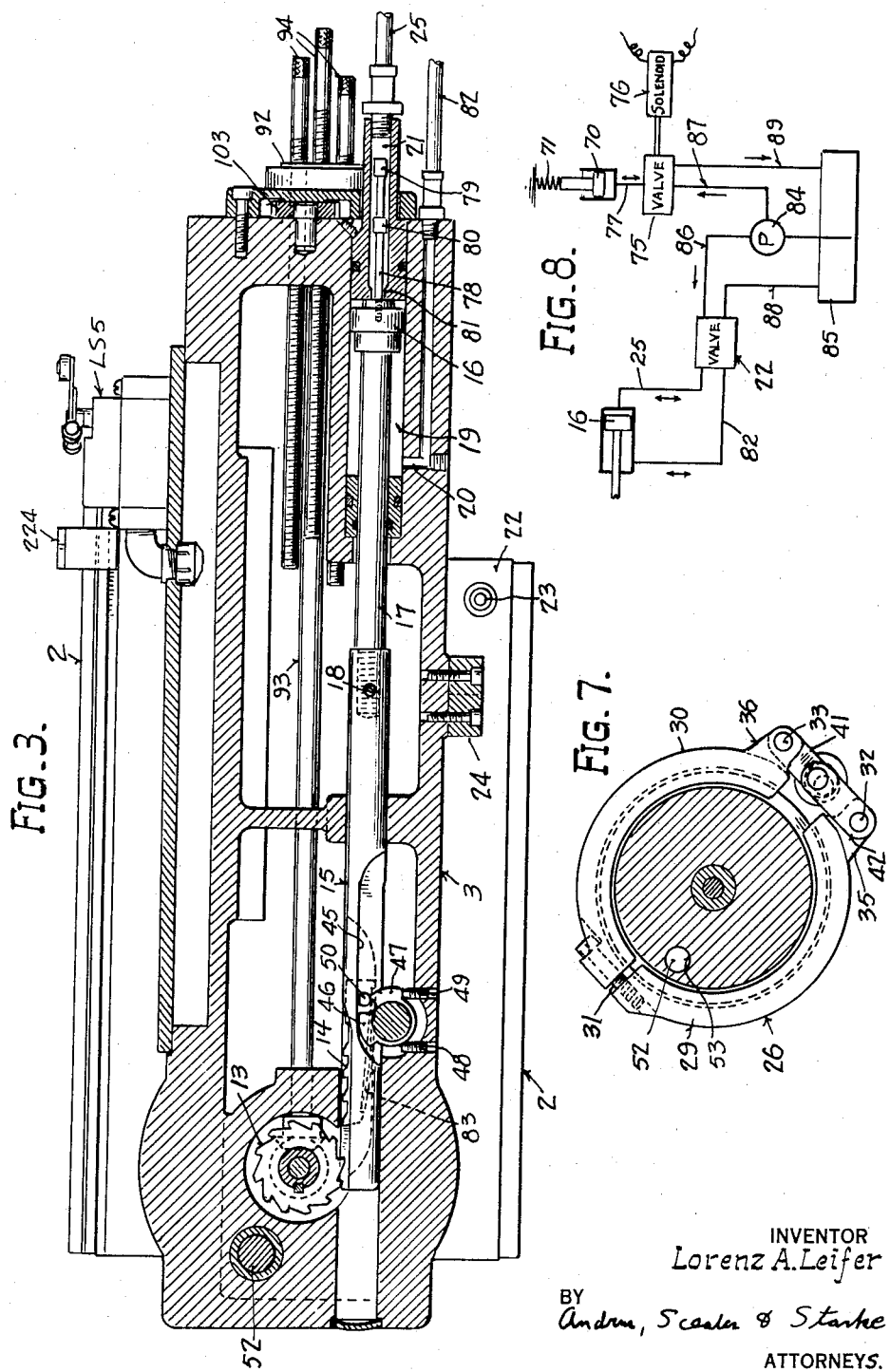
INVENTOR
Lorenz A. Leifer
BY
Andrus, Sceales & Starke
ATTORNEYS.

Sept. 13, 1960 L. A. LEIFER 2,952,168
AUTOMATIC RAM-TYPE TURRET LATHE
Original Filed Dec. 20, 1951 8 Sheets-Sheet 4
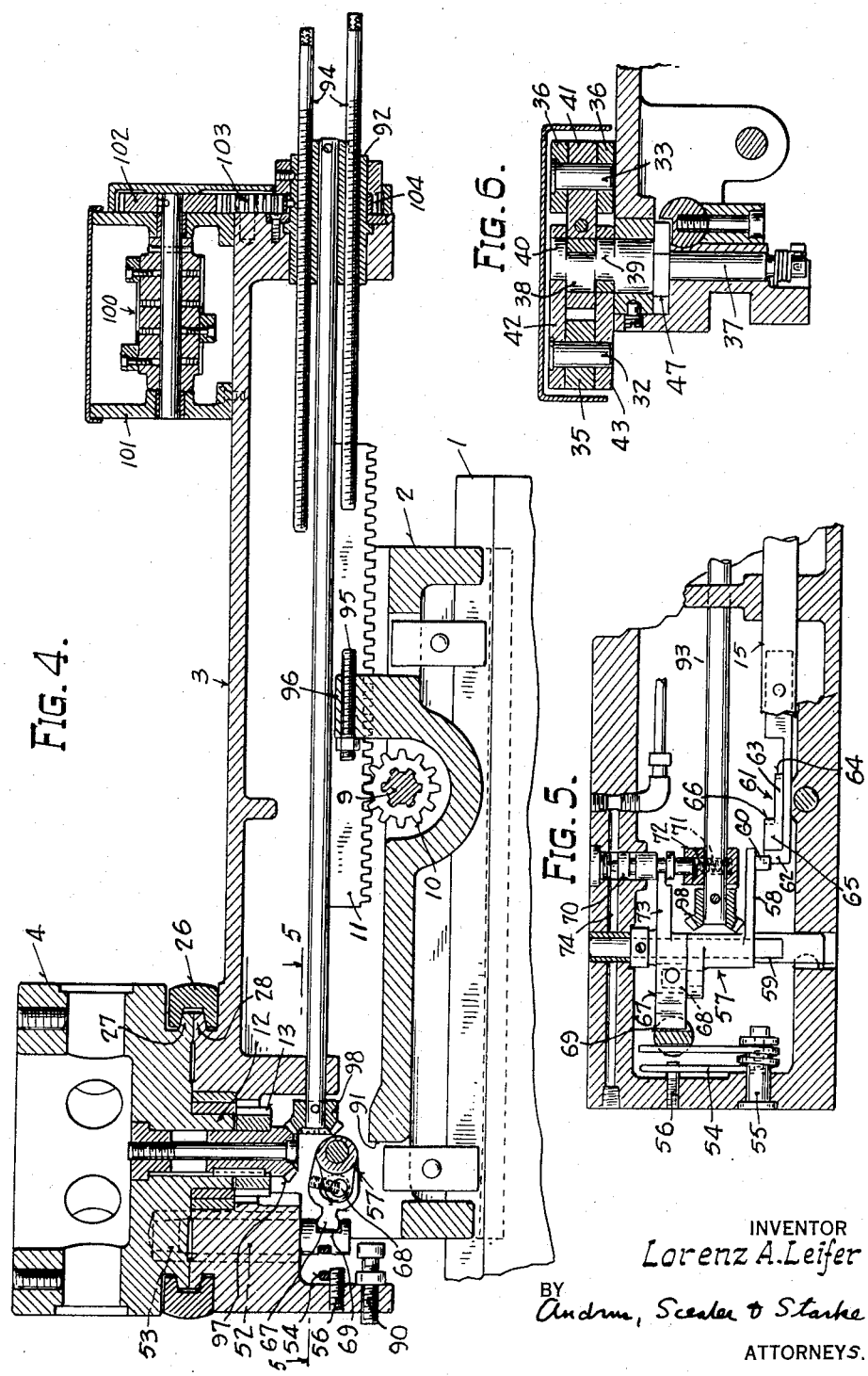
INVENTOR
Lorenz A. Leifer
BY
Andrus, Sceales & Starke
ATTORNEYS.

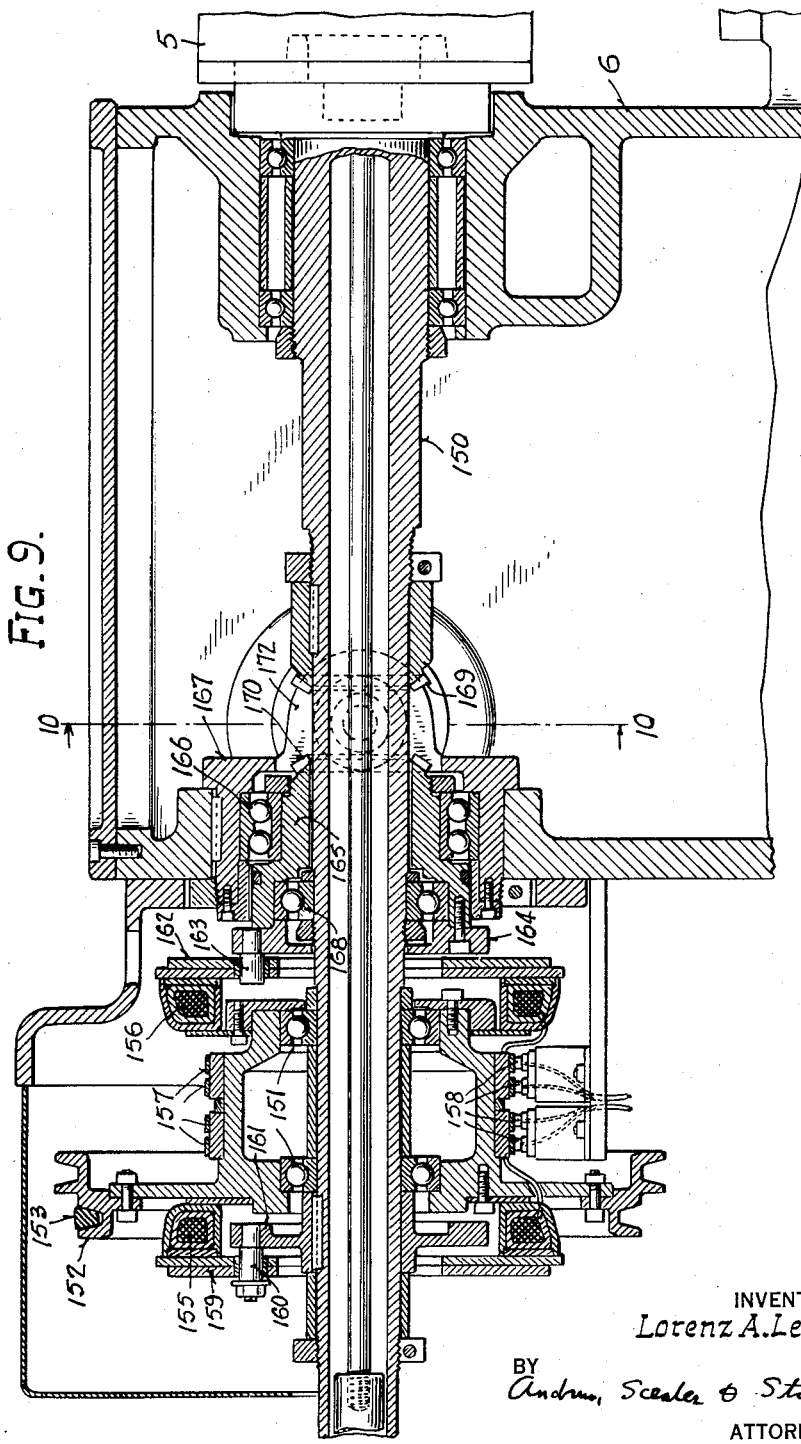

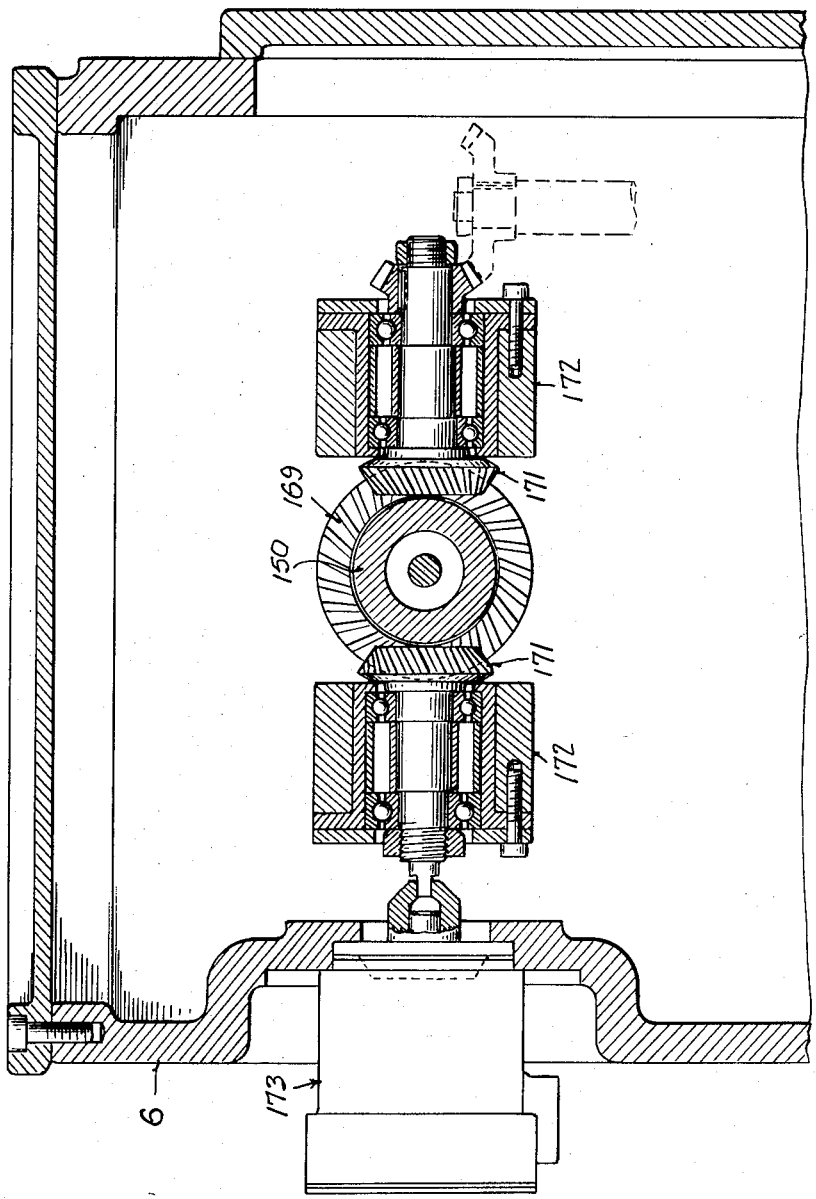

Sept. 13, 1960 L. A. LEIFER 2,952,168
AUTOMATIC RAM-TYPE TURRET LATHE
Original Filed Dec. 20, 1951 8 Sheets-Sheet 7
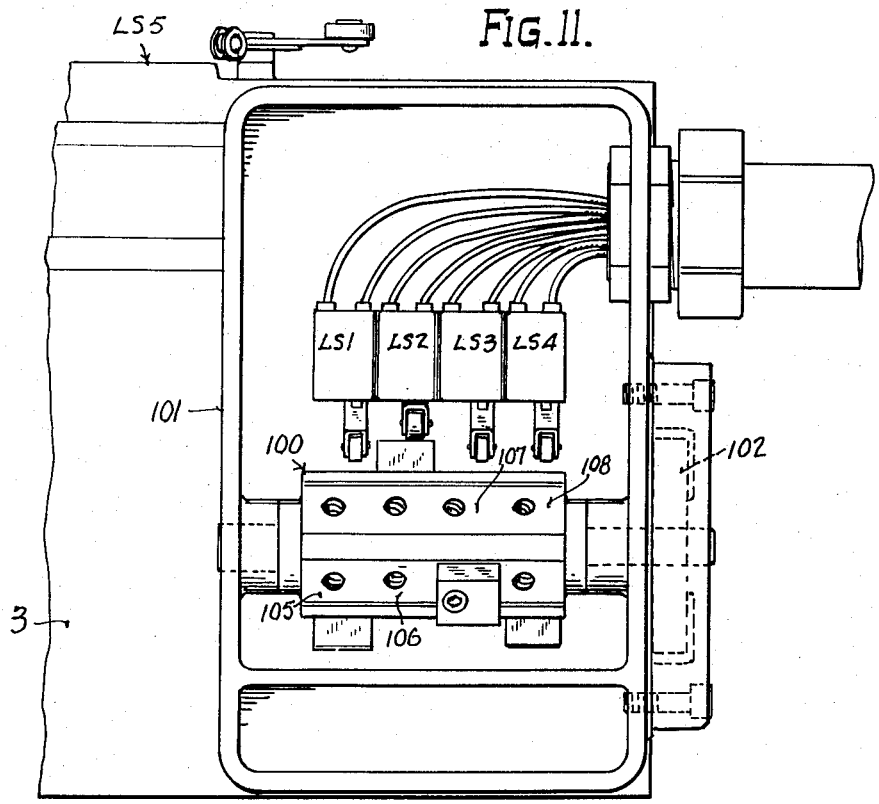
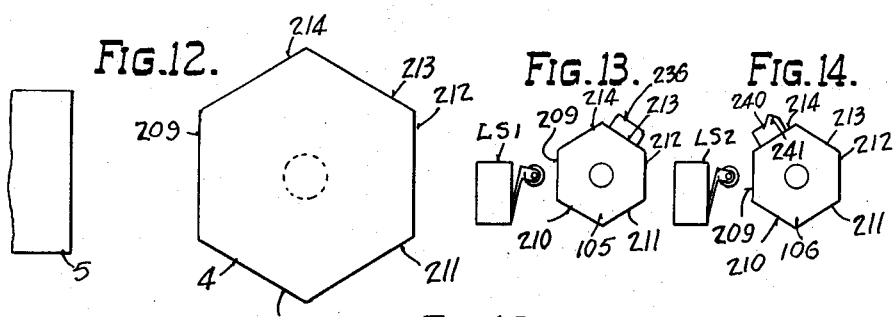
INVENTOR
Lorenz A. Leifer
BY Andrus, Sceales & Starke
ATTORNEYS.

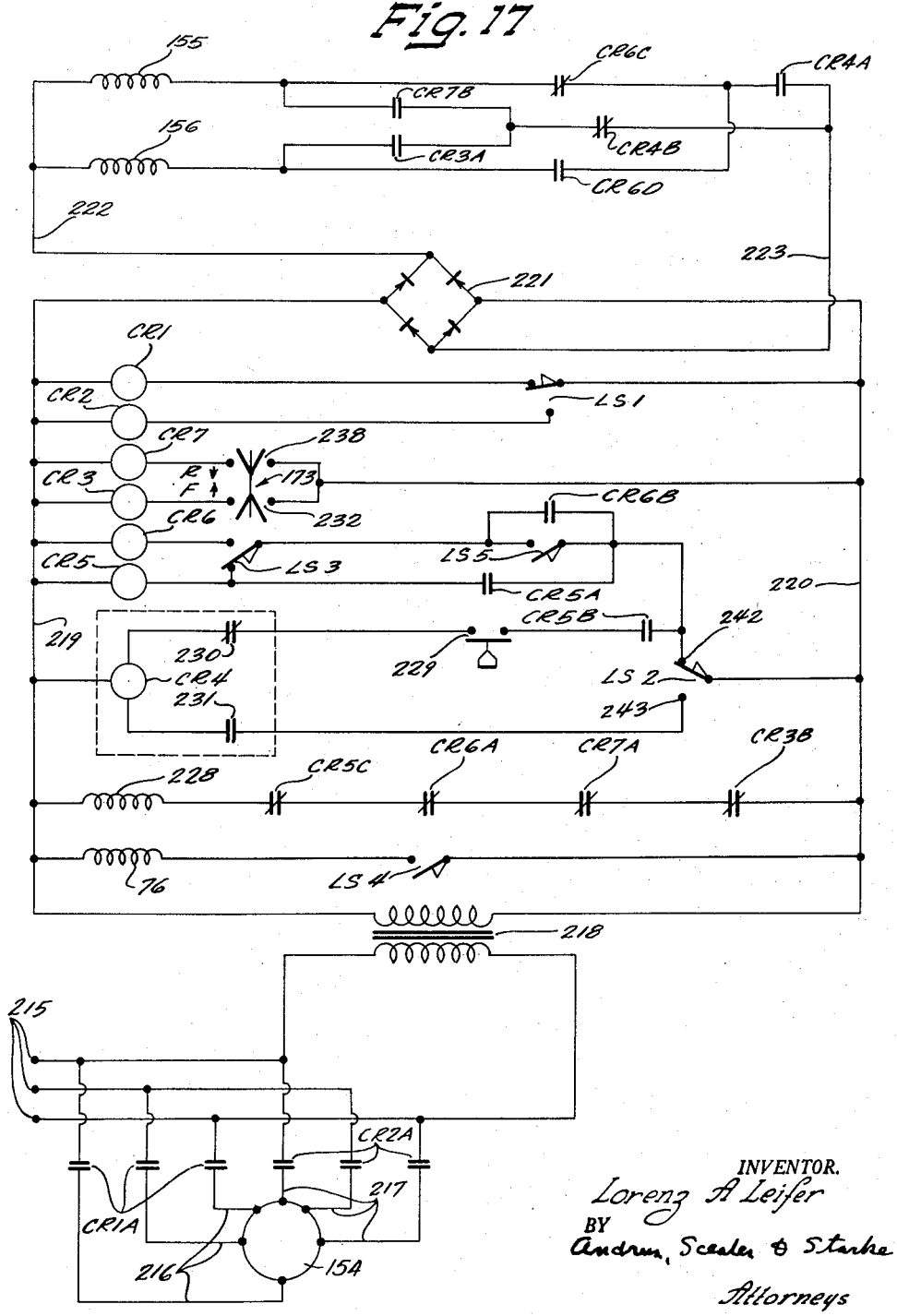

United States Patent Office 2,952,168
Patented Sept. 13, 1960

2,952,168

AUTOMATIC RAM-TYPE TURRET LATHE

Lorenz Albert Leifer, Madison, Wis., assignor to Gisholt Machine Company, Madison, Wis., a corporation of Wisconsin Original application Dec. 20, 1951, Ser. No. 262,617. Divided and this application July 31, 1957, Ser. No. 675,451

7 Claims. (Cl. 74—818)

This invention relates to automatic lathes. The invention has been applied to a ram-type turret lathe employing high spindle speeds of the order of several thousand r.p.m., and having a rapid work cycle preferably with manual ram movement.

This application constitutes a division of application Serial No. 262,617, filed December 20, 1951, for Automatic Ram-Type Turret Lathe, now abandoned.

One of the objects of the invention is to provide a lathe having automatic controls which facilitate a more rapid cycling of the lathe by the operator.

Another object is to provide a hydraulic power actuated turret index wherein a pre-selected single or double index may be obtained.

A further object is to provide a means for effecting single or double indexing of the turret at predetermined points in the lathe operating cycle.

The turret lathe of the invention is provided with an indexing mechanism comprising a hydraulically actuated pawl means which is automatically operated when the ram is in a retracted position to rotate the turret and place various tools in operating relation relative to the workpiece. The indexing of the turret is either double or single in accordance with the energized or de-energized condition of a solenoid valve which presents a cam follower portion of a locking pin retraction assembly to one of two cam faces on the pawl means. The solenoid valve is energized or de-energized at predetermined points in a lathe operating cycle by means of a control drum indexed with the turret, and chucking and unchucking of the workpiece is also performed automatically under the control of the control drum. A forward and reverse clutch assembly which incorporates spiral bevel gearing is utilized to provide rapid forward or reverse rotation of the spindle without reversing the spindle motor, the magnetic clutch portions of the reversing apparatus also being controlled by the control drum.

These and other objects of the invention will be set forth more fully in the following description of the embodiment of the invention illustrated in the accompanying drawings.

In the drawings:

Figure 1 is a front perspective view of the lathe;

Fig. 2 is a vertical transverse section axially of the hand wheel for operating the ram;

Fig. 3 is a horizontal section of the ram and saddle taken on line 3—3 of Fig. 2;

Fig. 4 is a vertical section of the ram and saddle taken axially of the stop rod shaft;

Fig. 5 is a detail section taken on line 5—5 of Fig. 4 and showing the shifting mechanism for actuating the turret lock pin and determining single or double indexing of the turret;

Fig. 6 is a detail section of the clamp ring actuating mechanism;

Fig. 7 is a detail schematic plan view of the clamp ring;

Fig. 8 is a schematic view of the hydraulic circuit;

Fig. 9 is a vertical section through the upper part of the headstock taken axially of the spindle;

Fig. 10 is a transverse section taken on line 10—10 of Fig. 9 and showing the spiral bevel reverse gears;

Fig. 11 is a top plan view of the control drum and switches, with the cover of the control box removed;

Fig. 12 is a schematic plan view of the turret, with suitable tools being shown in the turret for an illustrative lathe operating cycle;

Fig. 13 is a schematic view of the portion of the control drum which determines fast or slow operation of the spindle motor;

Fig. 14 is a schematic view of a portion of the control drum, showing a cam segment utilized in initiating the stopping of a lathe operating cycle;

Fig. 15 is a schematic view of the control drum portion and cam segments employed in controlling chucking operations and reversing of the spindle;

Fig. 16 is a schematic view of the portions of the control drum and corresponding cam segments adapted to control single or double indexing of the turret; and Fig. 17 is a wiring diagram for the control.

The turret lathe illustrated in the drawings comprises a bed 1 supporting a saddle 2 upon which a turret supporting ram 3 is reciprocably mounted. A hexagonally shaped turret 4 carried by ram 3 is extended to and retracted from a work piece carried by a chuck 5 on lathe headstock 6. The described ram 3 is manually reciprocated by rotation of a pilot wheel 7, but the ram may be automatically driven while operating in accordance with the invention.

As best shown in Fig. 2, the ram 3 is supported for movement by ways 8 carried by the stationary saddle 2. A drive shaft 9 extends laterally to within the saddle 2 from pilot wheel 7 inwardly terminating in a drive pinion 10. Pinion 10 reciprocally drives ram 3 on ways 8 by rotational engagement with a downwardly facing rack 11 carried by the wall of the ram opposite pilot wheel 7. Rack 11 extends longitudinally of ram 3 a distance to provide the desired range of ram stroke.

As ram 3 reciprocates relative to chuck 5 on headstock 6 by manual rotation of wheel 7 and drive pinion 10, tools carried on the six faces of turret 4 are selectively presented to a workpiece by rotational indexing of the turret.

For this purpose, turret 4 is mounted for rotation on a vertically disposed spindle 12 extending downwardly from the turret to within turret ram 3, as shown in Fig. 4. Near its bottom end, the spindle 12 carries a ratchet gear 13 keyed to rotate therewith. Rotation of ratchet 13 effects rotation of spindle 12 and indexing rotation of turret 4. The illustrated ratchet 13 carries twelve teeth, whereby a new tool face of hexagonal turret 4 is presented each time the ratchet has arcuate movement equivalent to two of the twelve teeth.

The ratchet 13 for indexing turret 4 is actuated by a pawl 14 carried at the forward end of an indexing control rod 15, as best shown in Fig. 3. Control rod 15 reciprocates independently of the movement of turret supporting ram 3 in response to movement of a piston 16 carried by a piston rod 17 rearwardly of and axially aligned with control rod 15. Piston rod 17 and control rod 15 are joined together in endwise relationship by a set screw 18 laterally projecting through the rod 15 and entering a portion of piston rod 17 carried internally of the rod 15.

Piston 16 for reciprocating indexing control rod 15 is disposed within a cylinder 19 formed in the body of ram 3. Fluid is alternately admitted to the cylinder 19 at opposite sides of the piston through passages 20 and 21 formed in the ram body.

Admission of power fluid to cylinder 19 is controlled by movement of the ram 3 on saddle 2. For this purpose a valve assembly 22 is carried by the saddle 2 and has a valve plunger 23 extending upwardly from the saddle adjacent the front side of ram 3. The ram 3 carries a trip block 24 on the front wall substantially centrally thereof. The valve plunger 23 extends upwardly into the path of trip block 24 and is depressed thereby when the ram 3 has reached the rearward end of its stroke.

Depression of valve plunger 23 by trip block 24 causes valve assembly 22 to admit fluid to the rear side of piston 16 through a fluid hose or conduit 25 connecting the valve assembly with passage 21 in the body of saddle 2. The piston 16, piston rod 17, and indexing control rod 15 are thus moved inwardly through ram 3 toward turret 4. The fluid system for controlling piston 16 is schematically shown in Fig. 8.

Forward movement of indexing control rod 15 eventually results in engagement between pawl 14, carried by the rod, and ratchet 13 carried by the turret spindle 12, whereby the turret is indexed. But, prior to engagement between the pawl and ratchet, it is necessary to release clamping and locking mechanism provided to secure the turret 4 against rotation in each indexed position.

The turret 4 is clamped against rotation by a channel shaped clamp ring 26 which encircles complementary annular flanges 27 and 28 respectively formed on a lower peripheral surface of the turret 4 and an upstanding frontal portion of ram 3. The flanges 27 and 28 are held against rotation in abutting relation by the clamp ring 26 during the working stroke of ram 3 and turret 4.

The clamp 26 is of the split ring type, comprising two half or semi-circular sections 29 and 30. Two of the meeting ends of sections 29 and 30 are joined by a pin 31 which permits a pivotal rocking action of section 30 about the pin, while the other ends are joined by link pins 32 and 33 and an eccentric connecting mechanism 34, as shown in Figs. 6 and 7. Link pin 32 extends through a reduced tongue 35 carried by the end of ring section 29. Link pin 33 extends through each of two vertically spaced lugs 36 carried by the end of ring section 30.

The link pins 32 and 33 are drawn together and separated with their associated clamp ring sections 29 and 30 to clamp and release turret 4 by the eccentric connecting mechanism 34. Mechanism 34 comprises a ring actuating spindle 37 having the lower end disposed in the body of ram 3 and with the upper portion extending upwardly from the body to between link pins 32 and 33.

The upper, enlarged portion of spindle 37 has three eccentric sections or cranks 38, 39 and 40 for causing relative movement between link pins 32 and 33 upon rotation of spindle 37 (see Fig. 6). Eccentric 38 is connected to link pin 33 by link 41 extending between lugs 36 in ring section 30. Eccentrics 39 and 40 are connected with link pin 32 by links 42 and 43 which straddle the tongue 35 on ring section 29. Rotation of spindle 37 in one direction cause the eccentrics to separate the link pins through the associated links 41, 42 and 43, while opposite rotation of spindle 37 draws the links and ring sections together to clamp turret 4.

Rotation of ring actuating spindle 37 and resulting tightening or release of clamp ring 26 is controlled by indexing control rod 15. Release of the clamp ring is effected prior to engagement between pawl 14 carried by the rod 15 and turret indexing ratchet 13. For this purpose control rod 15 is formed with an elongated recess 45 opening outwardly from the rod, as shown in Fig. 3. Spindle 37 extends downwardly from clamp ring 26 to adjacent rod recess 45, and a pair of lugs or knob abutments 46 and 47 are carried by the lower end of spindle 37 circumferentially spaced approximately 90 degrees of one another. Two stop screws 48 and 49 extend from the forward wall of ram 3 to adjacent opposite sides of spindle 37 to limit rotational movement of the spindle in opposite directions by engaging lugs 46 and 47 respectively.

Clamp ring actuating spindle 37 is disposed adjacent the path of control rod 15 whereby one of the lugs 46 or 47 is disposed in the recess 45 whenever the other lug is engaging the respective stop screw 48 or 49.

Rotation of spindle 37 to release clamp ring 26 occurs when a cam pin 50 extending upwardly from arm recess 45 engages the lug 46 on spindle 37, the spindle then being positioned as shown in Fig. 3. Upon engagement between cam pin 50 and lug 46, the spindle 37 is rotated counterclockwise as view in Fig. 3, with a resultant loosening of clamp sections 29 and 30 through the relocation of their respective link pins 32 and 33. Continued forward motion of control rod 15 causes lug 46 to engage the stop pin 48. Upon reverse travel of rod 15, the lug 47 is engaged by cam pin 50 to reclamp ring 26, as will be described.

The turret 4 is further held against rotation in a given indexed position by a locking pin 52 disposed within the forward end of ram 3 and extending upwardly to within a selected socket 53 formed in the underside of turret 4 adjacent each turret station or face. The pin 52 is pointed at its upper end and the mouths of sockets 53 are chamfered to facilitate entry of the pin to within the appropriate socket.

Pin 52 is withdrawn from a socket 53 prior to indexing of the turret 4. Retraction of pin 52 exists only for a period sufficient for rotational indexing of the turret, and the extension of the pin 52 into the socket associated with the turret face to be next worked terminates rotation of the turret in a given indexing cycle. Retraction of pin 52 is therefore but momentary.

As best shown in Fig. 5, the pin 52 is biased to extended or upward position by a hair-pin type spring 54 carried by a stud 55 extending from the forward wall of ram 3. The leg of spring 54 nearest the forward ram wall is held in a diagonally upward position by a screw 56 disposed adjacent stud 55. The other leg of the spring is carried by a slot in pin 52 and seeks to take an inclined position similar to its other leg thereby urging locking pin 52 upwardly.

The pin 52 is withdrawn or retracted by the pivotal action of a crank assembly 57. Assembly 57 comprises a cam lever 58 rotatable about a horizontally disposed pivot shaft 59 keyed to opposite walls of the ram 3. Lever 58 carries a follower 60 which is actuated by a cam 61 forming part of control rod 15. The cam 61 is disposed on rod 15 centrally of clamp ring cam pin 50 and pawl 14.

Cam 61 comprises two cam faces formed beside one another and extending longitudinally of rod 15. Both cam faces have a forward, rearwardly rising incline 62. A longer cam face, disposed outwardly of the ram 3, has its incline 62 extend into a flat portion 63 which drops off suddenly at a vertical surface 64 lying normal to rod 15. A shorter cam face, disposed inwardly of the ram 3, has its incline 62 extend into a flat portion 65, of lesser length than the flat surface 63 of the previously described cam face. Flat 65 for the shorter cam face drops off suddenly at a vertical surface 66.

Indexing control rod 15, having released clamp ring 26 through engagement between cam pin 50 and the lugs on clamp ring spindle 37, continues forwardly presenting cam 61 to the follower 60 on locking pin lever 58 to ride the lever upwardly for retraction of locking pin 52.

Follower carrying cam lever 58 effects retraction of locking pin 52 through a pin lever 67 disposed adjacent lever 58 on pivot shaft 59. The two levers are fixed together for pivotal movement by a coupling pin 68 extending therebetween. Lever 67 has its outer end disposed in a slot 69 formed in locking pin 52, whereby pivoting of pin lever 67 with cam lever 58 retracts the pin 52.

The coupling pin 68 joining pin lever 67 with cam lever 58 is loosely disposed between the same to permit a small amount of pivotal movement therebetween. The pin is spring pressed to a downward position whereby the levers are normally held substantially in a common plane. However, after the cam follower 60 has ridden beyond the rear end of cam 61 and the cam begins its rearward travel, the cam lever 58 may slightly pivot downwardly relative to pin lever 67 to ride below cam 61. After clearing below the cam, lever 58 pivots upwardly to again lie substantially in the plane of lever 67.

The present invention provides means for selectively indexing the turret 4 either one station or face for a cycle of ram reciprocation or two stations for each cycle. A single index of but one station is obtained when but two teeth on pawl 14 effect rotation of ratchet 13. A double index of two stations is obtained when all four teeth on pawl 14 operate the ratchet 13.

A single or double index is determined by the length of time locking pin 52 is retracted from the turret 4. The duration of pin retraction to unlocked position is in turn determined by the length of time cam lever 58 is retained in pivoted position by the engagement between its follower 60 and the faces of cam 61 as control rod 15 carries the cam forwardly. If the follower 60 is presented to the shorter cam face, the follower is retained on flat cam portion 65 only a time sufficient for one turret station to be indexed, the follower then dropping from the cam flat 65 as drop-off surface 66 is reached. However, if follower 60 is presented to the longer cam face, it is retained on flat 63 a time sufficient for two stations to be indexed before drop-off surface 64 permits cam lever 58 and pin lever 67 to pivot pin 52 to extended or locking position.

In Fig. 5, follower 60 is shown aligned with the short face of cam 61. The follower and its lever 58 may be automatically shifted to align with the longer face of cam 61 for double indexing by a hydraulically operated shifting plunger 70 supported for reciprocal movement laterally of ram 3 in a wall of the ram. Plunger 70 is biased outwardly of ram 3 by a compression spring 71 carried by a boss 72 extending upwardly from the bottom of the ram.

Inward movement of shifting plunger 70 against the action of spring 71 effects shifting of levers 58 and 67 and follower 60 through a shifting lever 73 rigidly connected with pin lever 67. Shifting lever 73 has its outer end provided with a yoke portion for attachment with a reduced portion of plunger 70. Plunger 70 is forced inwardly by pressure fluid admitted behind the plunger through a port 74 formed in the wall of ram 3 supporting the plunger. Admission of fluid is controlled by a valve assembly 75 schematically shown in Fig. 8. Valve assembly 75 is operated by a solenoid 76 which is in turn controlled by mechanism to be described. Fluid is supplied by valve 75 to port 74 for plunger 70 by a conduit 77. Valve 75 is of the type permitting conduit 77 and port 74, to serve as drains upon reversal of shifting, when fluid pressure is released and spring 71 forces plunger 70 outwardly to single index position.

While cam follower 60 rides on one of the faces of cam 61, the locking pin 52 remains in unlocked position and forward movement of control rod 15 effects indexing of turret 4 through engagement of ratchet 13 and pawl 14. The turret is single or double indexed depending on the duration of pin 52 retraction in turn determined by the position of shifting plunger 70.

To insure alignment of a lock pin receiving socket 53 with locking pin 52 when the pin is released for locking by cam 61, a dwell in the movement of control rod 15 and turret 4 is effected as each socket registers with the pin 52. The dwell is effected by temporarily throttling the admission of pressure fluid to the rear of piston 16 through passage 21. A tail rod 78 extends from the rear of piston 16 into passage 21 about which the pressure fluid normally flows. Tail rod 78 is formed with two flanges 79 and 80 which enlarge the rod at two points along its length. A reduced portion 81 is formed in passage 21 to laterally align with flanges 79 and 80 at points in the travel of control arm 15 when the turret 4 has been indexed so as to present a socket 53 above locking pin 52. When either flange 79 or 80 and reduced passage portion 81 align, supply of fluid through passage 21 is momentarily interrupted causing rod 15 to slow down in its forward movement with a reduction in rotary indexing speed. The locking pin 52 may then enter a socket 53 when the turret is rotating at reduced speed. During double indexing, forwardly disposed flange 80 throttles turret rotation when the first unused socket 53 registers with pin 52, and flange 79 effects throttling when the second used socket registers. During single indexing, only flange 80 reaches a throttling position in the travel of tail rod 78 with control rod 15.

When pin 52 has been released to extended position, indexing having been completed, the lathe operator may properly manually drive ram 3 forwardly of saddle 2 by rotation pilot wheel 7. As soon as ram 3 begins forward movement the trip block 24 carried by the ram moves from above valve plunger 23 releasing the same and terminating supply of fluid to the rear end of piston 16 through supply conduit 25. Released by block 24, the valve plunger 23 is biased to upward position and valve assembly 22 admits fluid to the forward side of piston 16 through a conduit 82 and passage 20 causing the piston and control rod 15 to move rearwardly.

When rod 15 moves rearwardly, the ratchet 13 and pawl 14 part. To facilitate parting of the respective teeth on the ratchet and pawl, pawl 14 is pivotally carried by control rod 15 upon the pin 50 which serves to actuate clamp ring spindle 37. The pawl is urged to a position in lengthwise alignment with rod 15 by leaf spring 83, but may swing laterally from ratchet 13 in separating from the same.

As control rod 15 moves rearwardly, the cam pin 50 engages lug 47 on clamp ring spindle 37 reclamping ring 26 and turret 4 in the newly indexed position of the latter. Rod 15, returns to its rearward position to await rearward travel of ram 3 after completion of the work cycle, at which time valve assembly 22 is again actuated by trip block 24 on the ram to cause the rod 15 to begin a second indexing stroke.

Valve assembly 22, related to piston 16 in the schematically shown hydraulic system of Fig. 8, is of the type permitting the inlet passages 20 and 21 leading to opposite sides of piston 16 to serve as drain passages upon reversal of piston action.

A pump 84 supplies fluid from a sump 85 to both valve assembly 22 for piston 16 and valve assembly 75 for shifting plunger 70, through fluid lines 86 and 87, respectively. Fluid line 88 leading from valve assembly 22 to sump 85 serves as a drain for the assembly. A line 89 to sump 85 serves as a drain for valve assembly 75.

Rearward movement of ram 3 on saddle 2 is limited by a stop screw 90 carried by a downwardly projecting portion of the ram at the front thereof. As shown in Fig. 4, stop 90 engages an upward abutment 91 on saddle 2 as the ram reaches the rear of its travel.

Forward movement of ram 3 is selectively limited by a stop roll 92 supported on a stop shaft 93 which extends longitudinally of ram 3 substantially centrally thereof. The roll 92 is carried by the rear end of shaft 93 and in turn supports six stop screws 94 equally spaced circumferentially of the roll, one screw for each turret face. Upon forward movement of the ram 3, the stop roll 92, carried therewith, presents a screw 94 in alignment with a stationary screw 95 carried by a lug 96 upstanding from saddle 2. Engagement between screw 95 and a stop screw 94 limits forward ram travel, their relationship being best shown in Fig. 4.

Stop roll 92 is indexed by the rotation of turret 4 and its spindle 12. For this purpose a gear 97 is carried with the spindle 12 at its lower end to rotate a gear 98 on the forward end of stop shaft 93 for roll 92. The stop roll is thus indexed to present a new stop screw 94 in correlation to presentation by turret 4 of a newly indexed face.

The stop roll 92 is utilized to actuate a control or indexing drum 100 which is rotatably mounted within a control box 101 at the upper and outer portion of the ram 3. Such actuation is effected by means of a gear 102 at one end of the drum, an idler gear 103 meshing with the gear 102 and mounted at the outer end of the ram 3, and a gear portion 104 provided on the periphery of the stop roll 92 and meshing with idler 103.

The drum 100 is generally hexagonal in shape, to correspond with the six sides of the turret 4, and is constructed with four controlling portions 105, 106, 107 and 108, which are adapted with threaded apertures to receive screws for securing suitable cam segments in position as will be described subsequently.

The ratios of the various gears 97, 98, 102, 103 and 104 which interconnect the control drum 100 with the turret 4 are such that the drum 100 rotates through the same angle as the turret 4 upon indexing of the latter. The control drum 100 therefore turns one position when the turret is single indexed and two positions when the turret is double indexed.

Referring to Fig. 11 the control portions 105, 106, 107 and 108 are adapted, respectively, to actuate a bank of four switches LS1, LS2, LS3 and LS4 which are suitably mounted within box 101 adjacent the drum 100. The rotated position of the drum at which the various limit switches are actuated depend upon the position of cam segments which are screwed at various positions on each drum control portion as previously mentioned. The control drum 100, together with the switches LS1, LS2, LS3 and LS4 and other switches and control equipment to be described hereinafter, provide an automatic lathe operating cycle during which spindle speed is adjusted, chucking and unchucking performed, and the turret 4 selectively single or double indexed at predetermined points in the operating cycle. It is also essential to provide rapid reversal and braking of the spindle at predetermined points in the cycle, which is accomplished, under the control of drum 100 and a cooperating switch LS3, by a forward and reverse clutch system next to be described.

Referring to Figs. 9 and 10, the forward and reverse clutch system for the lathe is mounted on the lathe spindle 150 at the outer portion of the headstock 6. The spindle 150 is provided at its outer portion with ball bearings 151 to rotatably support a suitable sheave 152, the latter being connected by means of a drive belt 153 to the spindle motor 154 indicated in Fig. 17.

The sheave 152 is constructed with an electromagnetic "forward" clutch coil 155 at its outer portion and a similar "reverse" clutch coil 156 at its inner portion. Both of the coils 155 and 156 are energized through suitable slip rings 157 and brushes 158 by means of wiring in the control system to be described hereinafter.

The forward clutch coil 155 cooperates with a magnetic clutch disc 159 which is movable longitudinally of spindle 150 and is connected by means of a pin 160 to a hub 161 keyed to the spindle. Accordingly, energization of coil 155 to attract clutch disc 159 causes driving of the spindle in the "forward" direction, that is to say in the same direction as the rotation of the driving sheave 152.

The reverse clutch coil 156 cooperates with a magnetic clutch disc 162 which is also movable longitudinally of spindle 150 and is connected by means of a pin 163 to a hub element 164. The hub element 164 is bolted to a sleeve 165 on the spindle 150, and both the hub element 164 and the sleeve 165 are freely rotatable relative to the spindle. The sleeve 165 is journalled by means of bearings 166 in a vertical mounting portion 167 of the headstock. The sleeve 165 serves, in turn, to rotatably support the spindle 150 by means of internal bearings 168.

In order to drivingly interconnect the sleeve 165 with the spindle 150, a spiral bevel gear 169 is provided circumferentially of the spindle and keyed thereto. A second and corresponding spiral bevel gear 170 is rigidly mounted at the inner end of the sleeve 165 and in axially spaced relation relative to the gear 169. The gears 169 and 170 are interconnected by means of a pair of opposed spiral bevel gears 171 which are mounted on opposite sides of the spindle and on an axis transverse to the spindle. As shown in Fig. 10, the gears 171 idle in gear housing portions 172 provided on the mounting portion 167 of the headstock. The gearing 169, 170 and 171 serves to effect rotation of the sleeve 165 and spindle 150 in opposite directions at all times when the spindle is being driven.

In the operation of the forward and reverse clutch system, energization of the forward clutch coil 155 effects a direct forward drive of the spindle by means of the disc 159 acting through the hub 161. Upon de-energization of the forward clutch coil 155 and energization of the reverse clutch coil 156, the spindle 150 is rapidly braked to a stop and rotated in the reverse direction by means of a drive which includes clutch disc 162, pin 163, hub 164, sleeve 165, gear 170, idler gears 171, and gear 169 on the spindle. The braking and reversing action, which is extremely rapid due to the opposite direction of rotation of the sleeve and spindle, takes place without the necessity of reversing the directions of rotation of the sheave 152 and motor 154.

The use of spiral bevel gearing, as described, permits the braking and reversing apparatus to be employed on lathes utilizing extremely high spindle speeds.

Referring to Fig. 10, a zero speed switch 173 is connected for driving by one of the idler gears 171. The zero speed switch 173 is provided with two sets of contacts, one of which is closed when the spindle is rotating forwardly and the other of which is closed when the spindle is rotating in a reverse direction, with neither set of contacts being closed when the spindle is stopped as the result of de-energization of both clutch coils 155 and 156. The zero speed switch is incorporated into the control system for the lathe and serves, together with the control drum 100 and cam segments thereon to provide an automatic lathe operating cycle.

The positioning of the various cam segments on the lathe indexing drum 100, as well as the construction and operation of the various controlling equipment for the lathe, will next be described in connection with an illustrative cycle of operation in which it is desired to drill, bore and tap a rough casting.

Referring to Fig. 12, it may be assumed that the turret 4 is provided with a suitable work holding fixture on one face 209 thereof. The adjacent face 210 of the turret is then provided with a drill, and the next face 211 with a boring implement. The next adjacent face 212 of the turret is not provided with any implement, but the following face 213 is provided with a suitable tapping tool. Similarly to the case of the face 212, the remaining turret face 214 is not provided with any implement. The faces of the control drum 100 are provided (Figs. 13–16) with numbers 209 through 214 to indicate the faces which are opposite the various switches LS1 through LS4 when the similarly labeled faces of the turret 4 are in operative position opposite chuck 5.

Referring to Fig. 17, the spindle motor 154, is adapted to be energized by suitable three phase power lines 215 acting through two sets of leads 216 and 217. The leads 216 are connected to energize a first motor winding which causes the motor to run at a relatively high speed, whereas the leads 217 are connected to energize a second motor winding which causes the motor to run at a relatively low speed.

One phase of the power lines 215 is utilized to energize a transformer 218, the secondary winding of which supplies a suitable voltage to a pair of leads 219 and 220. In order to provide direct current for the forward and reverse electromagnetic clutches 155 and 156 previously described, the leads 219 and 220 are connected to the input terminals of a bridge type selenium rectifier 221 with the output terminals of the rectifier being connected to leads 222 and 223 for energization of the clutch windings.

In the operation of the controlling circuit and related parts, assume that the work holding face 209 of turret 4 is opposite the chuck 5, and that a rough casting has been positioned in the work holding fixture on the face 209. Also assume that the ram 3 is at its outer or retracted position, and that spindle motor 154 is running due to energization thereof by suitable starting and stopping connections, not shown. There being no cam segments screwed to the face 209 of the indexing drum 100, none of the switches LS1 through LS4 are actuated although face 209 of drum 100 is adjacent the switches at this time. The switches LS1 through LS4 are therefore in the positions shown in Fig. 17, as are all of the various relays and relay contacts subsequently to be described.

The fast or slow operation of spindle motor 154 is controlled by suitable control relays CR1 and CR2 having normally open contacts CR1a and CR2a arranged respectively, in the leads 216 and 217. The coils of relays CR1 and CR2 are connected across leads 219 and 220 and are alternately energized through operation of the switch LS1 which is controlled by cam segments on portion 105 of the indexing drum. Since switch LS1 is now in the position shown in Fig. 17, winding CR1 is energized to close its contacts CR1a for operation of the spindle motor at its relative fast speed.

Both the forward clutch 155 and the reverse clutch 156 are de-energized at this time due to the opened condition of normally open contacts CR3a of a relay CR3 and CR4a of a two winding memory relay CR4.

As the first step in a cycle of operation to finish a particular workpiece, the operator turns the pilot wheel 7 to advance the ram 3 and turret 4 and effect insertion of the rough casting into chuck 5. When the turret is at its forwardmost position, a suitable limit switch LS5, which is mounted on the ram 3, engages a dog 224 on the saddle 2 and is thereby closed. This effects completion of a circuit through switches LS5, LS3, and LS2 to energize the coil of a relay CR5. Normally open contacts CR5a and CR5b of relay CR5, and normally closed contacts CR5c thereof, are thus caused to shift positions.

Upon shifting of the contacts CR5c, the chuck 5 is closed on the work piece by means next to be described. The chuck is of an air operated variety which is actuated by a rod disposed axially within spindle 150 and connected to a suitable piston which is mounted within a double acting air cylinder 225 located at the opposite end of the spindle 150 from the chuck. The air cylinder 225, which rotates with the spindle, is connected via a rotary seal to a suitable set of air hoses 226 leading to a source of air pressure. The air hoses 226 are mounted on an arm 227 which is arranged at the outer end of the spindle as shown in Fig. 1.

In order to control the flow of air through the hoses 226 and into the air cylinder 225 for actuation of chuck 5, a suitable solenoid valve mechanism 228 is mounted on the arm 227. The valve 228 is constructed to admit air to one of the hoses 226 and effect closing of the chuck 5 when the solenoid of valve 228 is de-energized, and to admit air to the other of the hoses 226 and effect chuck opening when the solenoid is energized. Accordingly, upon de-energization of the solenoid of valve 228, air is admitted to cylinder 225 in a manner to effect closing of the chuck 5 on the work piece. After such closing is effected, air pressure builds up in cylinder 225 and is utilized to close a suitable pressure responsive switch 229 for purposes later to be described. Switch 229 may be mounted on arm 227 adjacent the spindle end as shown in Fig. 1. For a more complete description of an actuating cylinder and piston for chuck 5, reference is made to U.S. Patent 2,415,181, issued February 2, 1947, to C. H. Johnson.

Referring again to Fig. 17, the solenoid portion of valve 228 is connected in series with normally closed relay contacts CR5c, CR3b, CR6a and CR7a across lines 219 and 220. Accordingly, upon energization of relay CR5 as described above, contact CR5c opens and causes de-energization of the chuck solenoid 228. The chuck 5 therefore closes on the work piece to secure the same in the desired position.

Air pressure then builds up in cylinder 225 to close the pressure switch 229, as previously stated, which in turn completes a circuit through switch LS2, the now closed contacts CR5b of relay CR5, and the normally closed contacts 230 of the two winding memory relay CR4 to energize one winding of memory relay CR4. The memory relay CR4 is of a double acting type which employs relatively hard iron adapted to retain its magnetism after it has been magnetized by a short pulse of current. When one winding of the relay CR4 is energized through contacts 230, the contacts 230 immediately open to de-energize the relay winding, and another set of memory relay contacts 231 immediately close. Although the one winding of relay CR4 is thus de-energized memory relay contacts 230, 231, CR4a and CR4b remain shifted due to the semi-permanent magnetism in the relay components. To effect shifting of the memory relay contacts to their initial positions, another memory relay winding must be energized through contacts 231.

The closing of normally open contacts CR4a of memory relay CR4 completes an energizing circuit for the forward clutch coil 155, which circuit includes the normally closed contacts CR6c of a relay CR6. As soon as the spindle starts to rotate in a forward direction due to energization of the forward clutch coil 155, the zero speed switch 173 is actuated in a direction to close one set 232 of contacts therein. This completes an energizing circuit for the relay CR3 to effect shifting of the contacts CR3a and CR3b thereof. The closing of the contacts CR3a, however, does not operate to energize the reverse clutch coil 156 since the energizing circuit comprising contacts CR3a includes the normally closed contacts CR4b which are opened when contacts CR4a are closed to energize the forward clutch coil 155. Similarly the opening of contacts CR3b has no effect at this time since the energizing circuit for chuck solenoid 228 is already maintained open by contacts CR5c.

As the next step in the operating cycle, the operator retracts the ram 3 and turret 4 to the outer positions thereof. When the ram is at its outer positions, the valve assembly 22 at the outer end of the saddle 2 is actuated by the trip block 24 as previously described. This causes the cylinder 19 to actuate the piston 16 and pawl 14 forwardly to engage the ratchet gear 13 and effect indexing of the turret 4 to the drill position, that is to say with turret face 210 opposite the chuck and work piece. This indexing operation is single only since the double indexing solenoid 76 is now deenergized due to the opened condition of limit switch LS4 which corresponds to control portion 208 of indexing drum 100. Since the double indexing solenoid 76 is de-energized, the spring 71 maintains the crank assembly 57 at a position at which the short flat 65 of cam 61 engages the cam follower 60 and effects retraction of locking pin 52 for a period of time sufficient to permit single indexing of the turret.

Although the control drum 100 is also single indexed during the above operation, because of the gear means 97, 98, 102, 103 and 104 which connect the turret 4 with the indexing drum 100, none of the limit switches LS1 through LS4 are actuated since there are no cam segments mounted on face 210 of the control drum.

During retraction of the turret 4 to its outer position, the limit switch LS5 on the ram 3 is disengaged from the dog 224 on the saddle 2 and is permitted to open. This, however, has no effect upon the now energized relay coil CR5 since normally open contacts CR5a of relay CR5 are bridged across switches LS3 and LS5 and are now in a closed condition. The de-energization of the chuck solenoid 228 is therefore maintained by relay contacts CR5c, so that the chuck 5 is maintained in its closed position as desired.

The lathe operator next rotates the pilot wheel 7 to advance the turret and perform a drilling operation. After drilling, the turret is retracted to again actuate valve assembly 22 and effect forward operation of indexing pawl 14. Single indexing of the turret 4 and the control drum 100 is thus again effected since the double indexing solenoid 76 is in a de-energized condition. However, as soon as the control drum 100 is indexed so that face 211 thereof is opposite the limit switches LS1 through LS4, the switch LS4 is actuated to closed position by a cam segment 233 on portion 108 of the drum. This effects energization of the double indexing solenoid 76 to operate the valve assembly 75 (Fig. 8) in a manner to shift plunger 70 laterally. The crank assembly 57 is therefore shifted laterally against the bias of spring 71 to position the same for actuation by the long flat face 63 of cam 61, so that during the succeeding indexing operation the long cam face 63 will engage the cam follower 60 and cause retraction of locking pin 52 for a sufficient period of time to permit double indexing of the turret 4 and the control drum 100 by pawl 14.

The boring tool, which is mounted on turret face 211 as previously mentioned, is thus arranged opposite the work so that a boring operation is effected upon the next advance of the ram 3 and turret 4 by the operator. After completion of the boring operation, the ram and turret are again retracted to actuate the pawl 14 and effect double indexing of the turret 4 and drum 100 to place the tapping tool on turret face 213 opposite the work piece. Suitable cam segments 234 and 235 on portion 108 of control drum 100 serve, during this rotation of drum 100 through two positions, to hold switch LS4 in a closed position and thereby maintain the energization of double indexing solenoid 76.

After rotation of the drum 100 to present the face 213 thereof to the associated switches, correspondingly to the positioning of face 213 of the turret 4 opposite the work piece, a cam segment 236 on portion 105 of the indexing drum comes into engagement with switch LS1 to shift the same from the position shown in Fig. 17 to the opposite position. The relay CR1 is therefore de-energized and the relay CR2 energized, so that contacts CR1a open to de-energize the high speed winding of spindle motor 154, and contacts CR2a close to energize the low speed winding thereof. The speed of the spindle motor is therefore reduced to a speed which is suitable for a tapping operation.

At the same time that the switch LS1 is actuated by cam segment 236 to reduce the spindle motor speed, the switch LS3 is actuated by a cam segment 237 mounted on face 213 of portion 107 of the control drum. The switch LS3 is thus shifted to set up a circuit for the energization of a relay coil CR6, the latter being connected in series with switches LS5, LS2 and LS3 across leads 219 and 220. Although switch LS3 is shifted, the energization of relay CR5 is maintained through contacts CR5a thereof.

As the next operation, the operator advances the turret and the tapping tool to perform a tapping operation. As soon as tapping is completed and the turret is in its forwardmost position, switch LS5 on ram 3 engages the dog 224 and is again actuated to its closed position, thereby closing the circuit through switches LS2 and LS7 and effecting energization of relay CR6. The normally closed contacts CR6a and CR6c of relay CR6 then shift to open position and the normally open contacts CR6d thereof shift to closed position.

The opening of relay contacts CR6c effects de-energization of the forward clutch 155, whereas the closing of contacts CR6d effects energization of the reverse clutch 156. The spindle is therefore rapidly braked to a stop and is operated in the reverse direction by means of the sleeve and bevel gear mechanism previously described. The tapping tool therefore backs out of the tapped hole in the work piece at a low speed as desired, with the energization of relay CR6 being continued after disengagement of switch LS5 from dog 224 by means of a holding circuit through contacts CR6b of relay CR6.

Upon reversal of the direction of spindle rotation, the zero speed switch 173 is actuated to a position at which contacts 238 thereof close and contacts 232 thereof open, so that a relay CR7 is energized and relay CR3 is de-energized. Contacts CR7a in the energizing circuit for chuck solenoid 228 thus opened and contacts CR3b in the same circuit closed. In addition, contacts CR3a in an energizing circuit for reverse clutch coil 156 are opened and contacts CR7b in an energizing circuit for forward clutch coil 155 are closed. This operation of the relays CR7 and CR3 sets up the control for an un-chucking operation and for a rapid braking operation to zero spindle speed upon completion of the cycle.

After the tapping tool has backed out of the work, the operator retracts the turret 4 and ram 3 and again effects actuation of valve assembly 22 to cause forward movement of the pawl 14. A double indexing operation of the turret 4 and indexing drum 100 is thereby again effected due to continued maintenance of double indexing solenoid 76 in an energized condition because of the continued closing of switch LS4 by a cam segment 239 on the control drum portion 108. During the double indexing operation, the work holding fixture is placed opposite the chuck, and the face 209 of the control drum 100 is arranged opposite the various switches LS1 through LS4. The drum 100 and turret 4 are thus in their initial positions, and none of the limit switches LS1 through LS4 are actuated, there being no cam segments on the face 209 of the drum 100.

Since there is no cam segment on drum face 209, switch LS4 is released to de-energize the double indexing solenoid 76 and permit shifting of crank assembly 57 under the bias of spring 71, so that the cam follower 60 is engaged by the short flat face 65 of cam 61 for a single indexing operation upon starting of a new cycle of operation. In addition, switches LS1 and LS3 are released and shifted to set up the control for fast forward spindle speed during the succeeding operating cycle.

Referring to Fig. 14, a special cam segment 240 having a raised edge 241 is mounted on face 214 of cam portion 106. The raised edge 241 is adapted to momentarily actuate the associated switch LS2 and then to release the same for return to its initial position shown in Fig. 17. The momentary actuation of switch LS2 away from a contact 242 thereof opens the energizing circuits for relays CR6 and CR7, and the momentary contact of the switch LS2 with a contact 243 thereof completes an energizing circuit through the now closed contacts 231 of memory relay CR4 to energize the second winding of the relay CR4. The contacts of memory relay CR4 are thus actuated to their initial positions, with contacts 230 being closed and 231 being open. When the memory relay CR4 is thus actuated, contacts CR4a thereof open to break the circuits through contacts CR6c and CR6d and make them inoperative to affect the forward and reverse clutches 155 and 156.

However, the closing of contacts CR4b of memory relay CR4 renders the contacts CR7b of relay CR7 operative to effect energization of forward clutch coil 155. The contacts CR3a of relay CR3 now being open due to operation of the zero speed switch 173, the reverse clutch 156 is de-energized. The forward clutch 155 therefore operates to brake the spindle rapidly to a stopped condition, at which both of the contacts 232 and 238 of the zero speed switch are open to de-energize relay CR7 and effect opening of contacts CR7b thereof. The forward and reverse clutches thus being de-energized, the spindle remains in the stopped condition.

As the spindle is braked to a stop from the reverse rotating direction, the contacts CR7a of relay CR7 are maintained open through operation of the contacts 238 of the zero speed switch. The chuck controlling solenoid 228 is therefore maintained in a de-energized condition in spite of the closing of contacts CR5c and CR6a due to shifting of relays CR6 and CR5 during momentary actuation of switch LS2 away from contact 242 thereof. As soon as the motor reaches a stopped condition, however, the zero speed switch effects de-energization of relay CR7 and consequent closing of contacts CR7a thereof to cause energization of the chuck solenoid. This, as previously described, causes the chuck to open and permits the work piece to fall out into the hand of the operator. A new work piece, inserted in the work holder during the cycle of operation just described, is then ready to be inserted into the chuck for a new operating cycle.

The zero speed switch 173 is thus utilized to effect unchucking upon stopping of the spindle motor and to effect braking of the spindle from either a forward or reverse rotating direction. If the spindle is rotating in a forward direction, the relay CR3 effects braking and effects continued maintenance of the chuck controlling solenoid 228 in a de-energized condition, whereas if the spindle is rotating in a reverse direction the relay CR7 effects braking and effects continued maintenance of the chuck solenoid 228 in a de-energized condition.

In addition to the described controlling circuit which is utilized to effect fully automatic operation of the lathe, suitable circuits, not shown, are provided to permit the steps to be performed manually by the operator.

The described operating and controlling means permit an extremely rapid operating cycle to be performed, so that the output of a particular lathe is greatly increased as compared to formed structures.

Various modes of carrying out the invention are contemplated as being within the scope of the following claims particularly pointing out and distinctly claiming the subject matter which is regarded as the invention.

I claim:

1. An indexing device comprising, a support member, an indexable rotatable element mounted thereon, means for indexing said element, a locking pin carried by said support member and mounted for selective endwise extension and retraction, a plurality of sockets in the body of said rotatable element each disposed to receive said locking pin in an indexed position of said rotatable element upon pin extension, a lever connected with said pin to effect endwise movement thereof, a cam movable parallel to said support member and having a plurality of cam faces of unequal length with each length corresponding to a different multiple of the time required for indexing of the rotatable element one station, and means disposed to shift said lever into selective registry with one of said cam faces to retain the pin retracted for the respective different multiple of time as said cam moves parallel to said support member.

2. An indexing device comprising, a support member, an indexable element mounted thereon, means for indexing said element, a locking pin carried by said support member and mounted for selective endwise extension and retraction, a plurality of sockets in the body of said indexable element with each socket disposed to selectively receive said locking pin at an indexed position of said indexable element upon pin extension, a lever disposed on said support member to retract and extend said pin, a cam support within said movable member and having a plurality of faces of unequal length selectively engageable by said lever to effect retraction of said pin during movement of said cam for different multiples of time, a piston forming a portion of said indexing means and connected to move said cam, a pressure fluid inlet passage disposed rearwardly of said piston in alignment therewith and formed with a restricted portion, a tail rod carried by said piston and extending within said passage, and an abutment carried by and enlarging a portion of said tail rod, said abutment being disposed to register with the restricted portion of said passage to temporarily throttle fluid admission just prior to registry of said pin with a socket.

3. An indexing device comprising, a support member, an indexable element mounted thereon and movable to a plurality of indexed positions, means for indexing said element, a multi-faced cam mounted on said support member and movable parallel thereto, transversely shiftable means connecting said cam and said indexable element, control means mounted on said support member and connected to rotate with said indexable element, a shifter member carried by said support member and disposed to shift said shiftable means to selectively position the same adjacent one of the cam faces, and means responsive to the position of said control means to selectively position said shifter member.

4. Indexing apparatus comprising, an indexable element mounted for rotation on a support member, means for indexing said indexable element, a locking pin carried by said support member and mounted for selective endwise extension and retraction, a plurality of sockets in the body of said indexable element with each socket disposed to receive said locking pin in an indexed position of said indexable element upon pin extension, a transversely shiftable lever connected with said pin to effect endwise movement thereof, a cam movable longitudinally within said support member and having a plurality of cam faces for engaging and pivoting said lever to retract said pin, said cam faces being of unequal length and each retaining said pin in retracted position for a different multiple of time required for indexing of the indexable element one station, a control drum geared to said indexable element for indexing therewith, solenoid operated means to shift said lever transversely for selective registry with one of said cam faces to retain the pin retracted for a selected different multiple of time, and electric circuit means connecting said control drum and said solenoid operated means for regulation by said control drum of the shifting of said lever.

5. Indexing apparatus comprising, a rotary element, a longitudinally movable rod disposed adjacent said element, gear means connecting said rod and said element so that longitudinal movement of the rod indexes the the element, means to shift said rod longitudinally, a plurality of sockets in said element for selectively receiving a locking pin therein, lever means mounted between said pin and said rod, a cam on said rod and disposed to engage said lever as said rod moves toward said element, said cam having a plurality of faces of unequal length, and means to shift said lever transversely into position for selective engagement by one of said cam faces so that movement of said rod longitudinally under the direction of said rod shifting means causes said lever to remove said pin from the respective socket for a time commensurate with the length of the selected cam face.

6. The apparatus of claim 5 which includes a control drum geared to said indexable element for rotation therewith, and means actuated by the position of said control drum to actuate said lever shifting means.

7. In an indexing apparatus for a rotary element having a plurality of sockets for selectively receiving a locking pin therein, a cam having a plurality of faces of unequal length, a lever connecting said cam with said pin for moving the pin into or out of a socket, means to move said cam to actuate said lever, and means to shift said lever into position for engagement by one of said cam faces.

References Cited in the file of this patent

UNITED STATES PATENTS

| | | |
|---|---|---|
| 728,573 | Hanson | May 19, 1903 |
| 886,719 | Murray | May 5, 1908 |
| 2,629,163 | Makant | Feb. 24, 1953 |
| 2,642,650 | Clark | June 23, 1953 |
| 2,669,006 | Soule | Feb. 16, 1954 |
| 2,777,190 | Von Krogh Sundt | Jan. 15, 1957 |